US012490113B2

(12) United States Patent
Desai et al.

(10) Patent No.: US 12,490,113 B2
(45) Date of Patent: Dec. 2, 2025

(54) GROUPING ACCESS POINTS FOR AUTOMATIC FREQUENCY COORDINATION

(71) Applicant: Cisco Technology, Inc., San Jose, CA (US)

(72) Inventors: Vishal S. Desai, San Jose, CA (US); Peiman Amini, Fremont, CA (US); Ardalan Alizadeh, Milpitas, CA (US); Sachin D. Wakudkar, St-Sulpice (CH)

(73) Assignee: Cisco Technology, Inc., San Jose, CA (US)

( * ) Notice: Subject to any disclaimer, the term of this patent is extended or adjusted under 35 U.S.C. 154(b) by 373 days.

(21) Appl. No.: 18/173,384

(22) Filed: Feb. 23, 2023

(65) Prior Publication Data

US 2023/0354052 A1    Nov. 2, 2023

Related U.S. Application Data

(60) Provisional application No. 63/363,694, filed on Apr. 27, 2022.

(51) Int. Cl.

| *H04W 4/02* | (2018.01) |
|---|---|
| *H04W 16/18* | (2009.01) |
| *H04W 24/02* | (2009.01) |
| *H04W 24/10* | (2009.01) |
| *H04W 52/30* | (2009.01) |
| *H04W 64/00* | (2009.01) |
| *H04W 72/0453* | (2023.01) |
| *H04W 72/29* | (2023.01) |
| *H04W 84/12* | (2009.01) |
| *H04W 88/08* | (2009.01) |
| *H04W 88/12* | (2009.01) |

(Continued)

(52) U.S. Cl.
CPC .......... *H04W 16/18* (2013.01); *H04W 4/023* (2013.01); *H04W 24/02* (2013.01); *H04W 24/10* (2013.01); *H04W 52/30* (2013.01); *H04W 64/003* (2013.01); *H04W 72/0453* (2013.01); *H04W 72/29* (2023.01); *H04W 84/12* (2013.01); *H04W 88/08* (2013.01); *H04W 88/12* (2013.01); *H04W 88/14* (2013.01); *H04W 92/02* (2013.01); *H04W 92/12* (2013.01); *H04W 92/14* (2013.01)

(58) Field of Classification Search
CPC ... H04W 4/02–029; H04W 16/02–225; H04W 24/02–10; H04W 48/02–20; H04W 52/02–60; H04W 64/003–006; H04W 72/02–569; H04W 84/005–22; H04W 88/005–188; H04W 92/02–24
See application file for complete search history.

(56) References Cited

U.S. PATENT DOCUMENTS

| 2015/0036488 A1 | 2/2015 | Mettu et al. |
| 2016/0157225 A1 | 6/2016 | Joshi et al. |

(Continued)

*Primary Examiner* — Timothy J Weidner
(74) *Attorney, Agent, or Firm* — Patterson + Sheridan, LLP

(57) ABSTRACT

A network controller and various methods for grouping access points for AFC are presented. A method includes assigning a plurality of access points to a plurality of groups based at least in part on stored AFC reports for the plurality of access points, determining, for each group of the plurality of groups, a centroid and an uncertainty range, and generating, for each group of the plurality of groups, an AFC query using the determined centroid and uncertainty range for the corresponding group.

20 Claims, 10 Drawing Sheets

(51) Int. Cl.
*H04W 88/14* (2009.01)
*H04W 92/02* (2009.01)
*H04W 92/12* (2009.01)
*H04W 92/14* (2009.01)

(56) References Cited

U.S. PATENT DOCUMENTS

| | | |
|---|---|---|
| 2018/0270673 A1 | 9/2018 | Chen et al. |
| 2019/0104495 A1 | 4/2019 | Patwardhan et al. |
| 2020/0145836 A1 | 5/2020 | Smith |
| 2022/0124684 A1 | 4/2022 | Segev et al. |
| 2024/0163837 A1* | 5/2024 | Lam .................. H04W 64/003 |

* cited by examiner

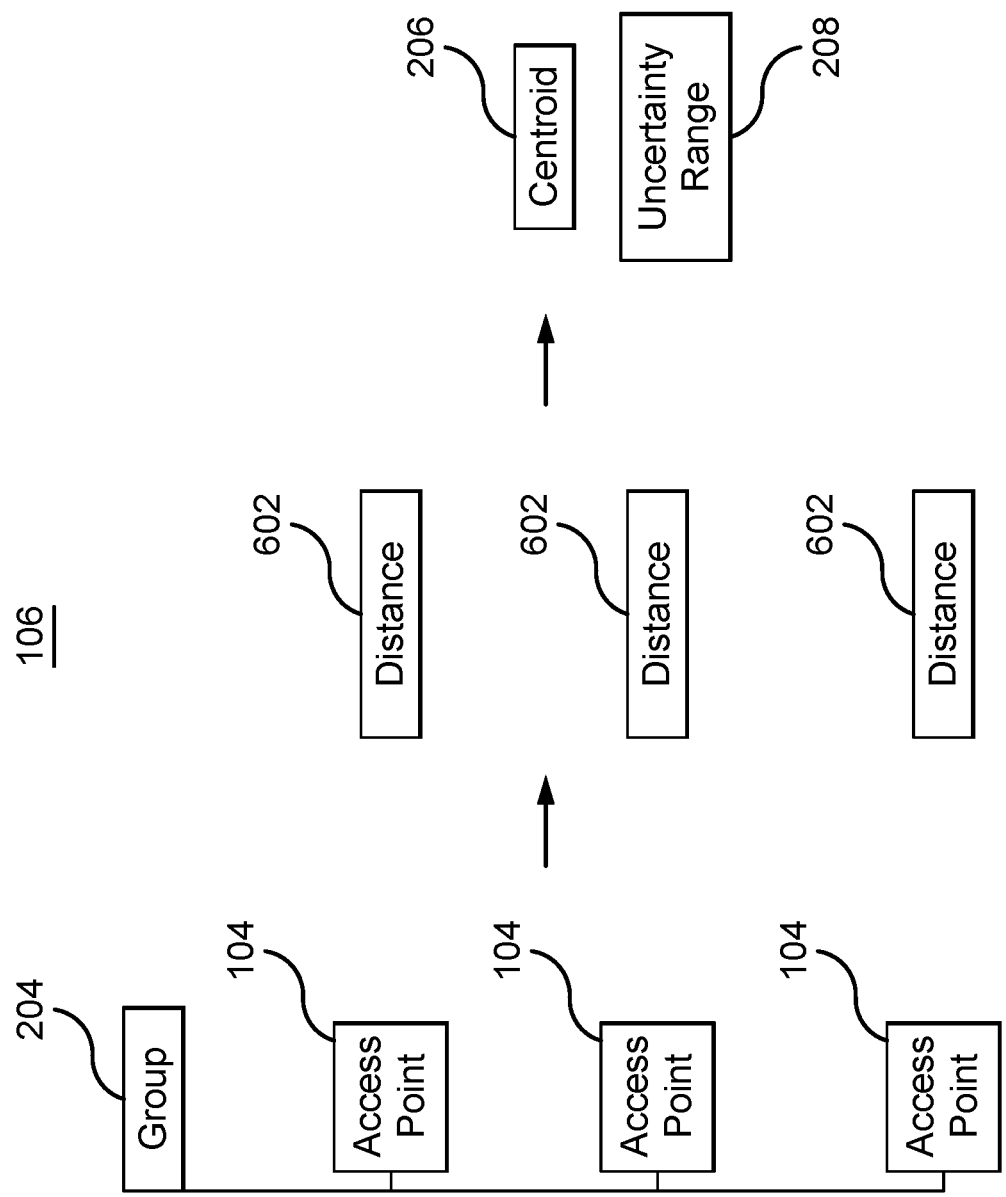

GROUPING ACCESS POINTS FOR AUTOMATIC FREQUENCY COORDINATION

CROSS-REFERENCE TO RELATED APPLICATIONS

This application claims benefit of U.S. provisional patent application Ser. No. 63/363,694 filed Apr. 27, 2022. The aforementioned related patent application is herein incorporated by reference in its entirety.

TECHNICAL FIELD

Embodiments presented in this disclosure generally relate to wireless communication. More specifically, embodiments disclosed herein grouping access points for the purposes of automatic frequency coordination (AFC).

BACKGROUND

A network deployment may include multiple access points positioned across a space (e.g., a building, a stadium, a conference space, etc.). Devices (e.g., computer, laptops, or mobile phones) may access the network by wirelessly connecting to the access points. AFC may be performed to determine whether one or more of the access points should communicate in a low power mode to avoid interfering with an incumbent network in the vicinity of the network.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIG. 6A illustrates an example controller in the system of FIG. 1.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
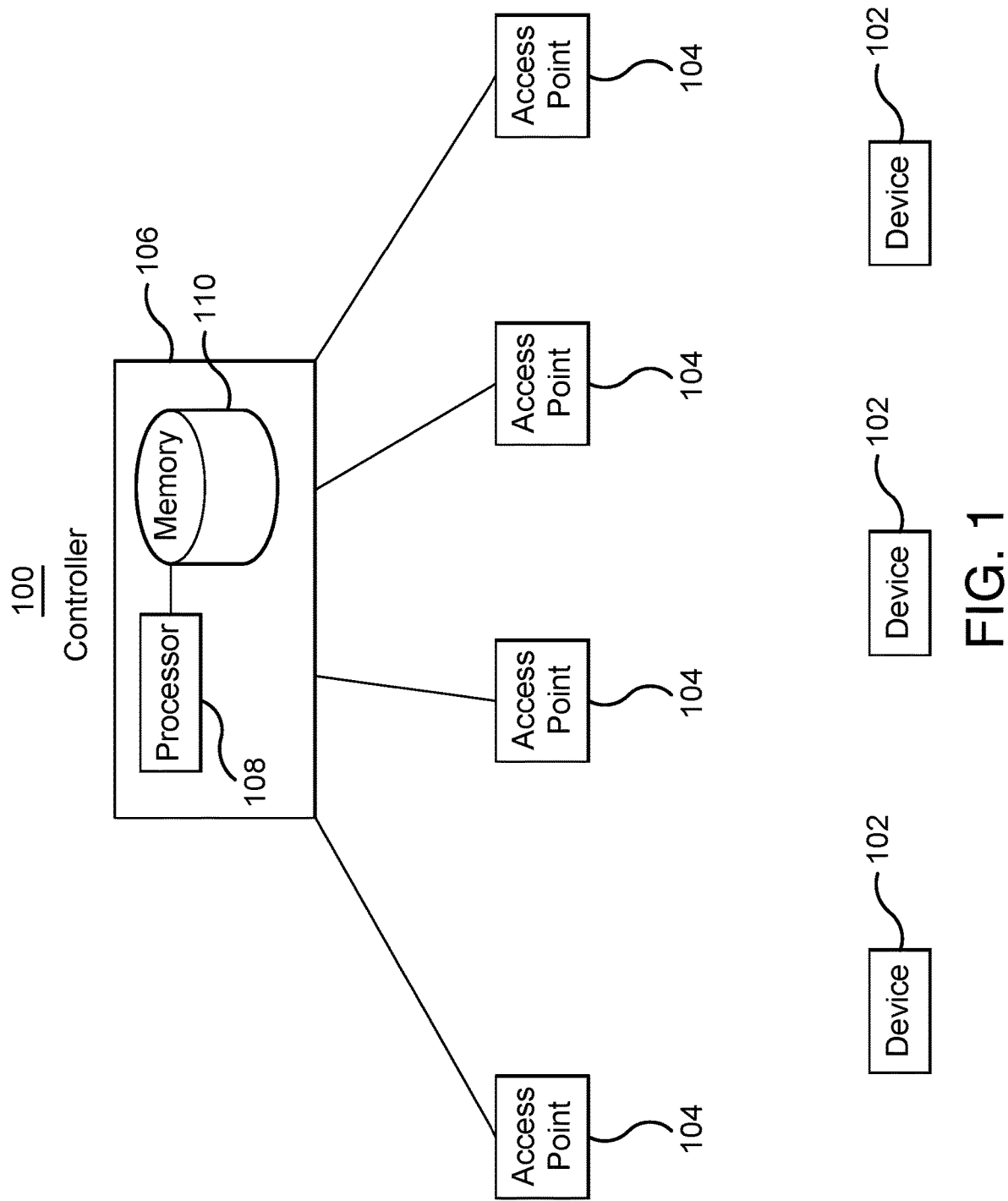
FIG. 1 illustrates an example system.

A network controller and various methods for grouping access points for AFC are presented. According to an embodiment, a method includes assigning a plurality of access points to a plurality of groups based at least in part on stored AFC reports for the plurality of access points, determining, for each group of the plurality of groups, a centroid and an uncertainty range, and generating, for each group of the plurality of groups, an AFC query using the determined centroid and uncertainty range for the corresponding group.

According to another embodiment, a method includes calculating a distance between a plurality of access points and an incumbent network and determining installation heights of the plurality of access points. The method also includes, for a first set of access points of the plurality of access points with distances to the incumbent network greater than a threshold, grouping the first set of access points based at least in part on the installation heights of the first set of access points to produce first groups of access points. The method further includes determining, for each group of the first groups of access points, a centroid and an uncertainty range and generating, for each group of the first groups of access points, an AFC query using the determined centroid and uncertainty range for the corresponding group.

According to another embodiment, a network controller includes a memory and a processor communicatively coupled to the memory. The processor assigns a plurality of access points to a plurality of groups based at least in part on stored AFC reports for the plurality of access points, determines, for each group of the plurality of groups, a centroid and an uncertainty range, and generates, for each group of the plurality of groups, an AFC query using the determined centroid and uncertainty range for the corresponding group.

EXAMPLE EMBODIMENTS

Large network deployments include multiple access points positioned across a space (e.g., a building, a stadium, a conference space, etc.). Wireless fidelity (WiFi) 6E access points in these network deployments are allowed to operate in a standard power mode and a low power mode depending on whether the access points are installed outdoors or indoors and whether the access points will interfere with incumbent networks (e.g., a cellular network) in the vicinity of the access points. In the standard power mode, the access points use a higher transmission power than when the access points are operating in the low power mode. AFC may be performed to determine whether one or more of the access points should communicate in the low power mode to avoid interfering with an incumbent network. As network deployments grow in size and the number of access points increases, however, it may become burdensome and costly to perform AFC individually for each access point in the deployment.

The present disclosure describes a network deployment that groups access points for the purposes of AFC. For example, the network deployment may group access points using information in previous AFC reports generated for the access points. As another example, the network deployment may group access points using distances between the access points and an incumbent network. After grouping the access points, the network deployment may calculate a centroid and an uncertainty range for each group. The centroid may be a position near the geographical center of the group that can be used as the location for an AFC request. The uncertainty range may also be provided in the AFC request to indicate a distance from the centroid where an access point may be located. The network deployment may then generate an AFC query for each group so that AFC is performed one time for the access points in the group. In this manner, the network deployment reduces the amount of AFC queries generated, which may improve network performance.

FIG. 1 illustrates an example system 100. As seen in FIG. 1, the system 100 includes one or more devices 102, one or more access points 104, and a controller 106. Generally, the devices 102 connect to one or more of the access points 104. The access points 104 provide network coverage for the system 100. The access points 104 communicate messages to the devices 102 and direct messages from the devices 102 towards their destination. In certain embodiments, the controller 106 groups the access points 104 and then generates AFC queries for the groups of access points 104, rather than having each access point 104 generate an AFC query for itself. In this manner, the controller 106 reduces the number of AFC queries for the system 100 and improves network efficiency and cost.

The device 102 may be any suitable device that wirelessly connects to one or more access points 104. As an example and not by way of limitation, the device 102 may be a computer, a laptop, a wireless or cellular telephone, an electronic notebook, a personal digital assistant, a tablet, or any other device capable of receiving, processing, storing, or communicating information with other components of the system 100. The device 102 may be a wearable device such as a virtual reality or augmented reality headset, a smart watch, or smart glasses. The device 102 may also include a user interface, such as a display, a microphone, keypad, or other appropriate terminal equipment usable by the user. The device 102 may include a hardware processor, memory, or circuitry configured to perform any of the functions or actions of the device 102 described herein. For example, a software application designed using software code may be stored in the memory and executed by the processor to perform the functions of the device 102.

The access point 104 facilitates wireless communication in the system 100. One or more devices 102 may connect to the access point 104. The access point 104 may then facilitate wireless communication for the connected devices 102. For example, the access point 104 may transmit messages to a connected device 102. As another example, the access point 104 may receive messages transmitted by the device 102. The access point 104 may then direct that message towards its intended destination.

The access point 104 may operate in a standard power mode or a low power mode depending on whether the access point 104 is installed outdoors or indoors and depending on whether the access point 104 will interfere with incumbent networks (e.g., devices in the incumbent networks) in the vicinity of the access point 104. When operating in the standard power mode, the access point 104 may transmit messages using a higher power than when the access point 104 is operating in the low power mode.

The access point 104 may perform AFC to determine whether the access point 104 will interfere with incumbent networks and whether the access point 104 should operate in the standard power mode or the low power mode. The access point 104 may generate and communicate to an AFC system an AFC query that includes, among other things, the location of the access point 104. The AFC system may return an AFC report that tells the access point 104 whether to operate in the standard power mode or the low power mode. In some instances, the AFC report may also provide the access point 104 with a range of allowed transmission powers and frequency ranges that the access point 104 may use. The access point 104 may configure its transmission using the information in the AFC report to avoid interfering with incumbent networks.

As network deployments grow larger and the number of access points increases, it becomes more costly and burdensome for the access points to perform AFC individually. For example, the more access points that there are in a network, the more AFC queries and AFC reports that must be handled for the network.

The controller 106 may be a network controller that facilitates or manages the access points 104. In some embodiments, the controller 106 is integrated within one or more of the access points 104. Generally, the controller 106 groups the access points 104 in the system 100 for performing AFC. For example, the controller 106 may group the access points 104 and then perform AFC for the groups, rather than for the access points 104 individually. As a result, the controller 106 reduces the number of AFC queries generated for the system 100, in certain embodiments. In the example of FIG. 1, the controller 106 includes a processor 108 and a memory 110, which perform the functions and actions of the controller 106 described herein.

The processor 108 is any electronic circuitry, including, but not limited to one or a combination of microprocessors, microcontrollers, application specific integrated circuits (ASIC), application specific instruction set processor (ASIP), and/or state machines, that communicatively couples to memory 110 and controls the operation of the controller 106. The processor 108 may be 8-bit, 16-bit, 32-bit, 64-bit or of any other suitable architecture. The processor 108 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 108 may include other hardware that operates software to control and process information. The processor 108 executes software stored on the memory 110 to perform any of the functions described herein. The processor 108 controls the operation and administration of the controller 106 by processing information (e.g., information received from the access points 104, devices 102, and memory 110). The processor 108 is not limited to a single processing device and may encompass multiple processing devices.

The memory 110 may store, either permanently or temporarily, data, operational software, or other information for the processor 108. The memory 110 may include any one or a combination of volatile or non-volatile local or remote devices suitable for storing information. For example, the memory 110 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 110, a disk, a CD, or a flash drive. In particular embodiments, the software may include an application executable by the processor 108 to perform one or more of the functions described herein.

Figure 2:
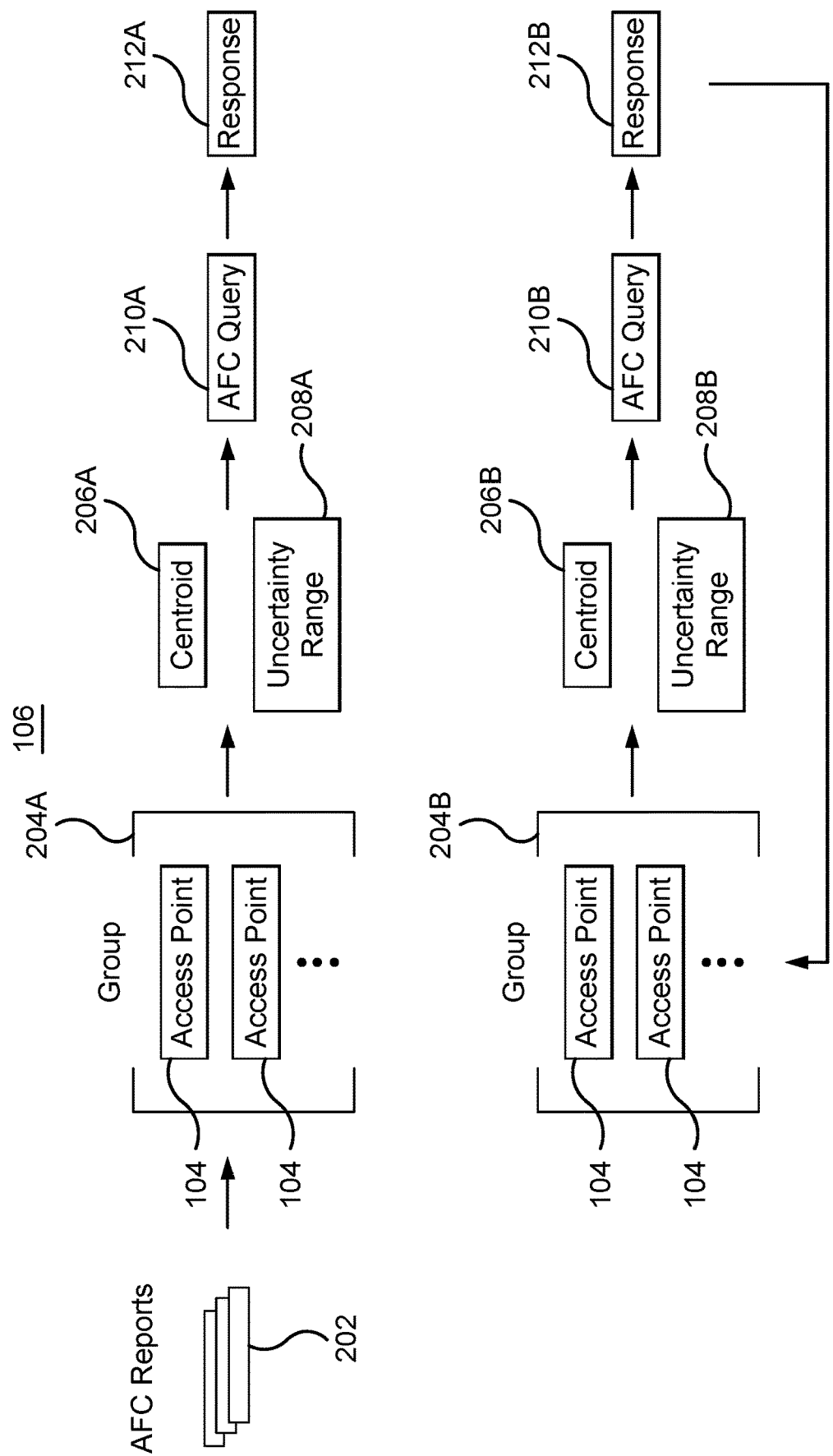
FIG. 2 illustrates an example controller in the system of FIG. 1.

FIG. 2 illustrates a general operation of the controller 106 in the system 100 of FIG. 1. The controller 106 begins by storing or retrieving AFC reports 202 that were previously generated for the access points 104 in the system 100. The AFC reports 202 may include information about the access points 104, such as the location of the access points 104 and the allowed transmission powers of the access points 104.

The controller 106 uses the information in the AFC reports 202 to group the access points 104.

The controller 106 may form any suitable number of groups 204 and assign any suitable number of access points 104 to the groups 204. The access points 104 in a group 204 may be installed close to each other and/or may have similar transmission powers to each other. As a result, an AFC response or report for the group 204 may be applicable to the access points 104 assigned to the group 204. In the example of FIG. 2, the controller 106 generates groups 204A and 204B of access points 104 using the information in the AFC reports 202.

After forming the groups 204A and 204B, the controller 106 determines centroids 206 and uncertainty ranges 208 for the groups 204. Generally, the centroid 206 indicates a location to be used for performing AFC for the group 204. Stated differently, the centroid 206 represents a location of a fictitious access point that is used to represent the access points 104 assigned to the group 204. The uncertainty range 208 may be a distance from the centroid 206 in which the fictitious access point may be located. Generally, the uncertainty range 208 may be large enough to encompass the physical locations of the access points 104 assigned to the group 204. Stated differently, the access points 104 assigned to the group 204 may be located within the uncertainty range 208 of the centroid 206 for the group 204. In the example of FIG. 2, the controller 106 determines a centroid 206A and an uncertainty range 208A for the group 204A. The controller 106 also determines a centroid 206B and an uncertainty range 208B for the group 204B.

The controller 106 generates AFC queries 210 for the groups 204. Generally, the controller 106 uses the centroid 206 and the uncertainty range 208 for a group 204 to generate the AFC query 210 for the group 204. The AFC query 210 may include the centroid 206 and the uncertainty range 208. In the example of FIG. 2, the controller 106 generates an AFC query 210A for the group 204A using the centroid 206A and the uncertainty range 208A. The controller 106 also generates an AFC query 210B for the group 204B using the centroid 206B and the uncertainty range 208B.

The controller 106 communicates the AFC queries 210A and 210B to an AFC system so that AFC may be performed for the groups 204A and 204B. The controller 106 may receive a response 212 to each AFC query 210. In the example of FIG. 2, the controller 106 receives a response 212A and a response 212B for the groups 204A and 204B, respectively. The responses 212A and 212B may indicate whether the groups 204A and 204B should operate in the standard power mode or the low power mode. Additionally, the responses 212A and 212B may indicate allowed ranges of transmission powers and transmission frequencies for the groups 204A and 204B.

In certain embodiments, the controller 106 adjusts the groups 204A and 204B using the information in the responses 212A and 212B. For example, the controller 106 may divide the group 204B based on information in the response 212A or the response 212B. The controller 106 may create a new group 204 and assign some of the access points 104 from the group 204B to the new group 204. As another example, the controller 106 may move access points 104 from the group 204A to the group 204B or vice versa using information from the responses 212A and 212B. After the controller 106 adjusts the groups 204A and 204B, the controller 106 may regenerate the centroids 206A and 206B and the uncertainty ranges 208A and 208B. The controller 106 may then regenerate the AFC queries 210A and 210B and perform AFC for the new groups 204A and 204B.

Figure 3:
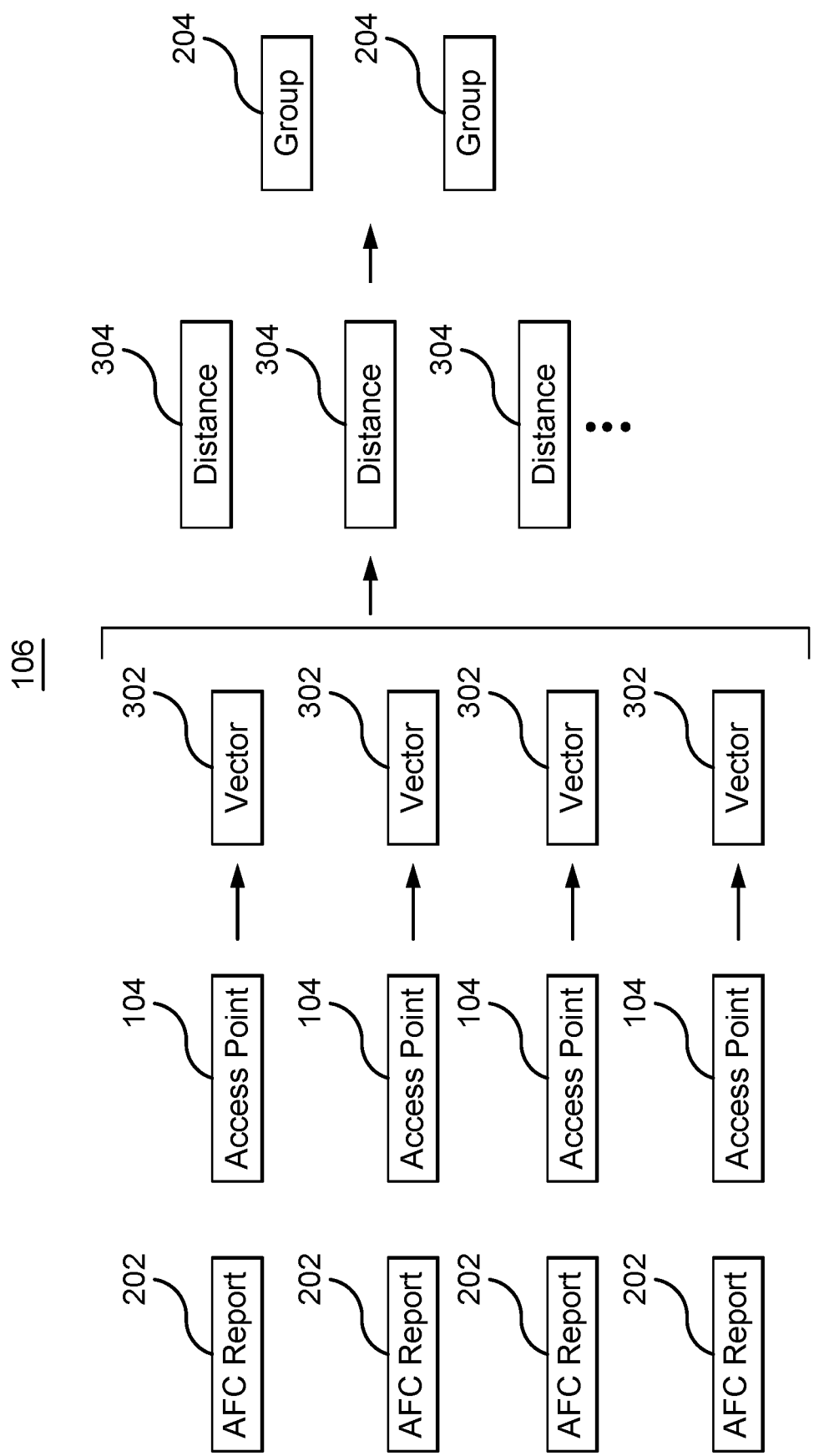
FIG. 3 illustrates an example controller in the system of FIG. 1.

FIG. 3 illustrates an example controller 106 grouping access points 104 in the system 100 of FIG. 1. In the example of FIG. 3, the controller 106 uses information in AFC reports 202 for the access points 104 to group the access points 104. As discussed previously, the AFC reports 202 may have been previously generated for the access points 104 by an AFC system. The AFC reports 202 may indicate the locations (e.g., geolocations) of the access points 104 and the allowed transmission powers for the access points 104. The controller 106 analyzes the information in the AFC reports 202 and generates vectors 302 using that information. The controller 106 may generate a vector 302 for each access point 104 using the information in the AFC report 202 for that access point 104. A vector 302 for an access point 104 may be a numerical representation of the location of the access point 104 and the allowed transmission power for the access point 104.

The controller 106 then determines distances 304 between the vectors 302. For example, the controller 106 may determine the Euclidean distance between each of the vectors 302. A distance 304 between two vectors 302 may indicate how physically distant or close the access points 104 for those vectors 302 are from each other and how similar or different the allowed transmission powers for the access points 104 are to each other.

The controller 106 may assign access points 104 to groups 204 based on the determined distances 304 between the vectors 302 for the access points 104. Generally, the controller 106 may assign access points 104 to groups 204 using the distances 304 between the vectors 302 for the access points 104. For example, the controller 106 may cluster the access points 104 (e.g., agglomerative hierarchical clustering) using the distances 304 to assign the access points 104 to groups 204. As a result, a group 204 may include access points 104 that are physically close to each other and that have similar allowed transmission powers. The controller 106 may be reasonably confident that AFC may be performed once for the access points 104 in the group 204 and that the results of the AFC process may be generally applicable to the access points 104 in the group 204.

Figure 4:
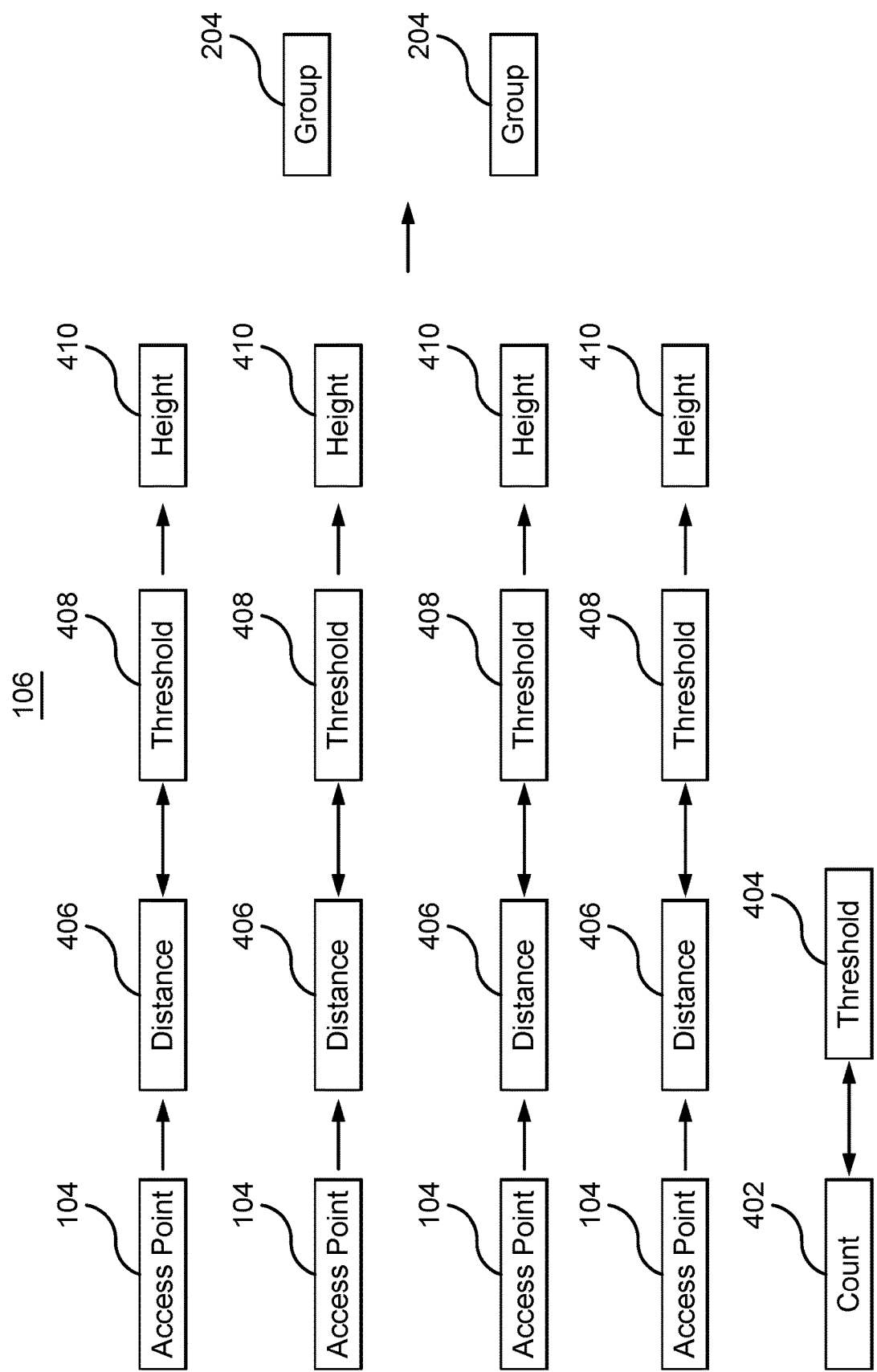
FIG. 4 illustrates an example controller in the system of FIG. 1.

FIG. 4 illustrates an example controller 106 grouping access point 104 in the system 100 of FIG. 1. In the example of FIG. 4, the controller 106 groups access points 104 without using information from previous AFC reports 202 for the access points 104. For example, the previous AFC reports 202 for the access points 104 may not be available in the example of FIG. 4.

The controller 106 may begin by determining a count 402 of the access points 104 in the system 100. The controller 106 may determine the number of access points 104. The controller 106 may then compare the count 402 with a threshold 404. If the count 402 is below the threshold 404, then the controller 106 may not group the access points 104. Instead, the controller 106 may instruct the access points 104 to perform AFC individually. When the count 402 exceeds the threshold 404, the controller 106 may begin grouping the access points 104.

The controller 106 may begin by determining distances 406 between each access point 104 and an incumbent network. The distance 406 may be a radio frequency distance between the access points 104 and the incumbent network. In some embodiments, the controller 106 may also determine whether the access points 104 are within line-of-sight or not within line-of-sight of the incumbent network.

The controller 106 may compare the distances 406 with a threshold 408. The threshold 408 may be set according to a height 410 of the access points 104. The controller 106 may determine the installation heights 410 for the access points 104. The controller 106 may then analyze the heights 410 to determine a suitable threshold 408. By comparing the distances 406 with the threshold 408, the controller 106 may determine the access points 104 that are within the threshold 408 distance of the incumbent network and the access points 104 that are further than the threshold 408 distance from the incumbent network. For the access points 104 that are further than the threshold 408 distance from the incumbent network, the controller 106 may instruct these access points 104 to perform AFC individually. The controller 106 may group the access points 104 that are within the threshold 408 distance of the incumbent network. In some embodiments, the controller 106 groups these access points 104 based on whether the access points 104 are within line-of-sight or not within line-of-sight of the incumbent network. The controller 106 then assigns these access points 104 to the groups 204. In this manner, the controller 106 assigns the access points 104 to groups 204 even when previous AFC reports 202 are not available for the access points 104.

Figure 5A:
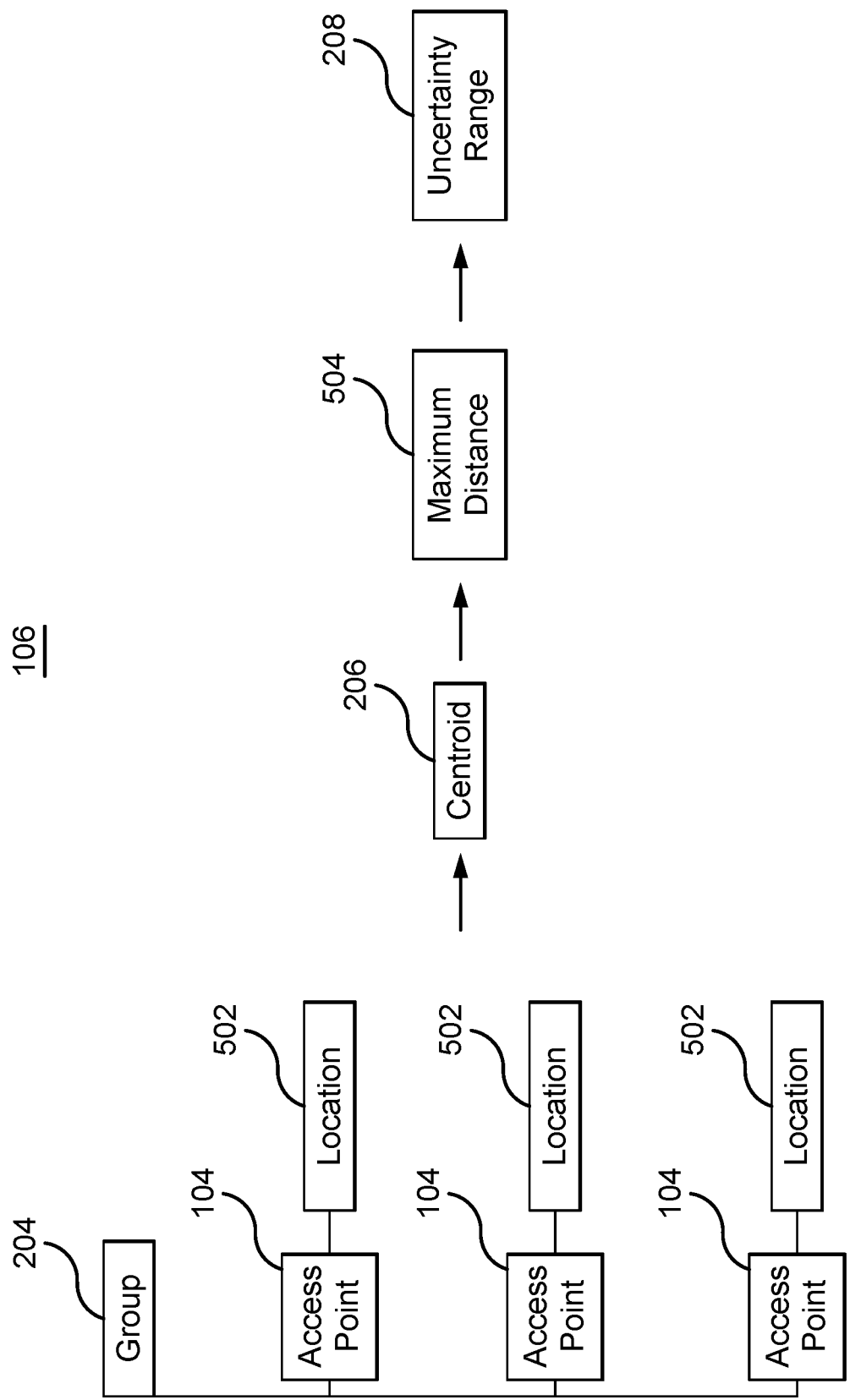
FIG. 5A illustrates an example controller in the system of FIG. 1.
Figure 5B:
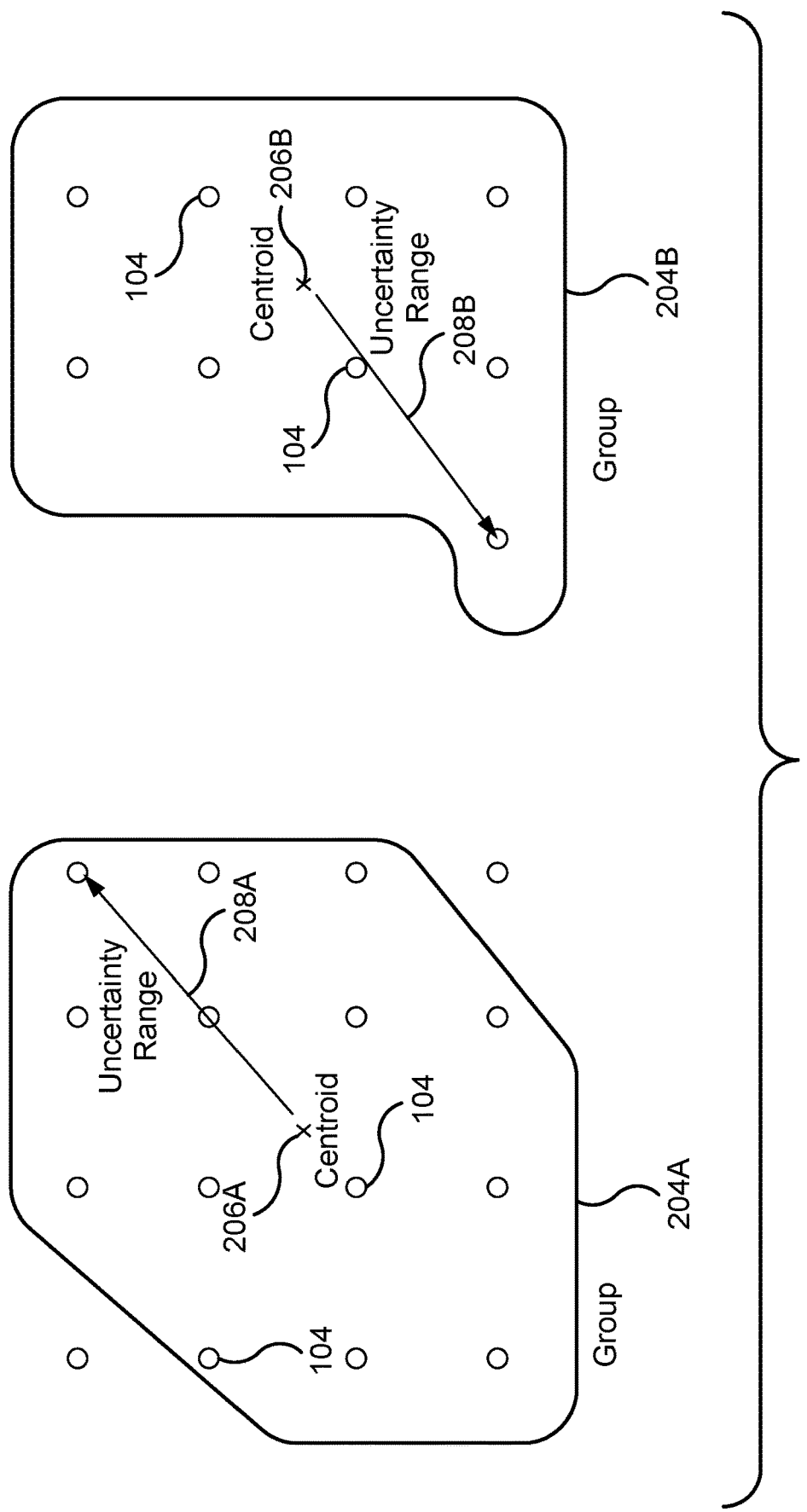
FIG. 5B illustrates an example grouping of access points in the system of FIG. 1.

FIGS. 5A and 5B illustrate an example technique that the controller 106 in the system 100 of FIG. 1 uses to determine a centroid 206 and an uncertainty range 208 for a group 204 of access points 104. As seen in FIG. 5A, the controller 106 begins with a group 204 of access points 104. The controller 106 may determine a location 502 for each access point 104 in the system 100. The locations 502 may be the installation location (e.g., geolocation) of the access points 104 in the system 100 (e.g., expressed as coordinates). The controller 106 may determine a centroid 206 using the locations 502. For example, the centroid 206 may be an average of the locations 502 of the access points 104. Thus, the centroid 206 may not be a location where an access point 104 is installed. Rather, the centroid 206 may represent a midpoint of the installation of access points 104.

The controller 106 then determines a maximum distance 504 (e.g., a straight-line distance) from one of the locations 502 to the centroid 206. The controller 106 may subtract the location 502 of each access point 104 from the centroid 206 to determine which access point 104 has the maximum distance 504 from the centroid 206. In this manner, the controller 106 determines an access point 104 in the group 204 that is furthest from the centroid 206. The controller 106 then uses the maximum distance 504 as the uncertainty range 208 for the group 204. As a result, the uncertainty range 208 represents the furthest distance that an access point 104 in the group 204 is from the centroid 206. Each access point 104 in the group 204 is installed within the uncertainty range 208 of the centroid 206. The controller 106 may then generate an AFC query for the group 204 using the centroid 206 and the uncertainty range 208.

In some embodiments, the controller 106 uses the variance of the distances between the access points 104 and the centroid 206 to determine the uncertainty range 208. For example, the controller 106 may assume that the distance measurements have a normal or Gaussian distribution with the measured distance as the mean. A 95% certainty is roughly equivalent to the 2-Sigma (the distance from center/mean of a random variable to two times the standard deviation). Thus, if the centroid 206 is treated as a normal random variable, then its standard deviation may be used to determine the uncertainty with a 95% certainty.

FIG. 5B illustrates an installation of access points 104. For clarity, not all of the access points 104 are labeled in the example of FIG. 5B. As seen in FIG. 5B, some of the access points 104 are assigned to a group 204A and some of the access points 104 are assigned to a group 204B. The group 204A has a centroid 206A and the group 204B has a centroid 206B. The centroids 206A and 206B may be determined as an average of the installation locations (e.g., geolocations) of the access points 104 assigned to their respective groups 204A and 204B. Thus, the centroids 206A and 206B are close to or near a midpoint of the installation locations of the access points 104 in the groups 204A and 204B. The centroids 206A and 206B may not be a location where an access point 104 is actually installed.

Each of the groups 204A and 204B also have an uncertainty range 208A and 208B. The uncertainty ranges 208A and 208B may be the maximum distance between an access point 104 and the centroid 206A or 206B in the respective groups 204A or 204B. Thus, the uncertainty ranges 208A and 208B are a distance between the centroids 206A and 206B and an actual access point 104 in the groups 204A and 204B.

Figure 6B:
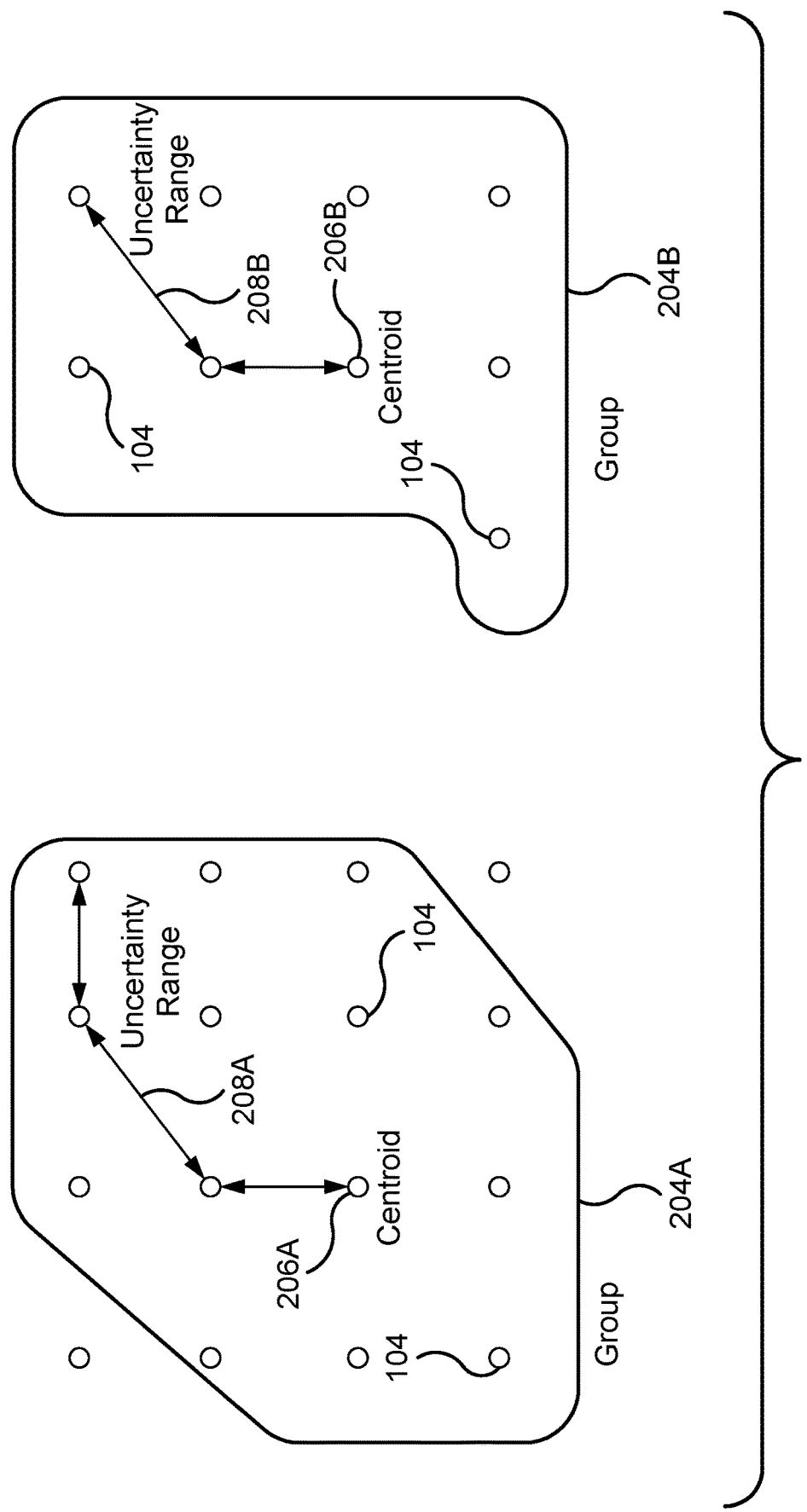
FIG. 6B illustrates an example grouping of access points in the system of FIG. 1.

FIGS. 6A and 6B illustrate an example technique that the controller 106 in the system 100 of FIG. 1 uses to determine a centroid 206 and an uncertainty range 208 for a group 204 of access points 104. As seen in FIG. 6A, the controller 106 begins with a group 204 of access points 104. The controller 106 then calculates distances 602 between the access points 104 in the group 204. The controller 106 may use any suitable technique for determining the distances 602 between the access points 104. For example, the controller 106 may use received signal strength indicators (RSSI) to determine the distances 602. As another example, the controller 106 may use two-way ranging (e.g., fine timing measurements), Bluetooth, or ultra wide band technologies to determine the distances 602 between the access points 104 in the group 204.

The controller 106 uses the distances 602 to determine the centroid 206. For example, the controller 106 may consider each access point 104 as a node in a graph and each distance 602 as an edge in the graph. The controller 106 may then determine a central node for this geometric graph. For example, the controller 106 may determine the center of the graph as the node that minimizes the greatest distance to the other nodes in the graph. This center node is then used as the centroid 206. As a result, the centroid 206 represents the location of an access point 104 of the group 204.

The controller 106 also uses the distances 602 to determine the uncertainty range 208. Generally, the controller 106 may determine the uncertainty range 208 by determining the maximum distance between a node in the graph and a central node of the graph. This maximum distance may be the summation of the edges in between the central node and the node. In some embodiments, the controller 106 may perform additional calculations on the maximum distance to determine the uncertainty range 208. For example, the uncertainty range 208 may be calculated based on variances of distances between nodes in the graph and the central node. In this manner, the controller 106 determines the centroid 206 and the uncertainty range 208 for the access points 104 in the group 204. The controller 106 may then generate AFC queries that include the centroid 206 and the uncertainty range 208.

FIG. 6B illustrates an example installation of access points 104. For clarity, not all of the access points 104 are labeled in FIG. 6B. As seen in FIG. 6B, some of the access points 104 are assigned to the group 204A and some of the access points 104 are assigned to the group 204B.

The group 204A has a centroid 206A, and the group 204B has a centroid 206B. In the example of FIG. 6B, the centroids 206A and 206B represent the locations of actual access points 104 in the groups 204A and 204B. The centroids 206A and 206B may have been determined as the central nodes of a graph where the access points 104 in a group 204 are the nodes of the graph and the distances 602 between the access points 104 in the group 204 are the edges of the graph. The centroids 206A and 206B may represent locations of access points 104 in the groups 204A and 204B whose graphical nodes minimize the greatest distance to the other nodes in the graph.

The groups 204A and 204B also include the uncertainty ranges 208A and 208B. In the example of FIG. 6B, the uncertainty ranges 208A and 208B may be the maximum distance from the centroids 206A and 206B to another access point 104 in the groups 204A and 204B. The uncertainty ranges 208A and 208B may be the summation of the distances between the centroids 206A and 206B and the furthest access point 104 in the groups 204A and 204B.

Figure 7:
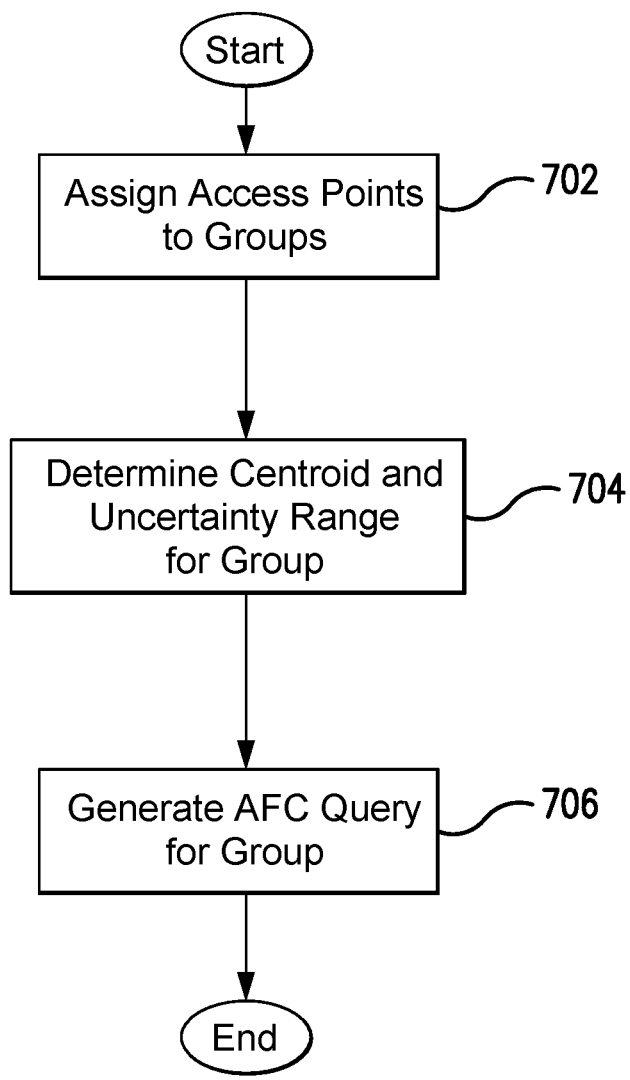
FIG. 7 is a flowchart of an example method performed in the system of FIG. 1.

FIG. 7 is a flowchart of an example method 700 performed in the system 100 of FIG. 1. In particular embodiments, the controller 106 performs the method 700. By performing the method 700, the controller 106 groups access points 104 and generates AFC queries 210 for the groups 204.

In block 702, the controller 106 assigns access points 104 to groups 204. The controller 106 may assign the access points 104 to the groups 204 in any suitable manner. For example, the controller 106 may assign access points 104 to groups 204 using information in previous AFC reports 202 for the access points 104. These AFC reports 202 may indicate the locations and allowed transmission powers of the access points 104. The controller 106 may cluster the access points 104 using the locations and allowed transmission powers to assign the access points 104 to groups 204. As another example, the controller 106 may assign access points 104 to groups 204 using the distances 406 between the access points 104 and an incumbent network. The controller 106 may assign access points 104 that are within a threshold 408 distance of the incumbent network to groups 204 depending on whether those access points 104 are within line-of-sight or not within line-of-sight of the incumbent network.

In block 704, the controller 106 determines a centroid 206 and an uncertainty range 208 for a group 204 of access points 104. The controller 106 may determine the centroid 206 and the uncertainty range 208 in any suitable manner. For example, the controller 106 may determine the centroid 206 as an average of the locations of the access points 104 in the group 204. As another example, the controller 106 may determine the centroid 206 as a graphical center of the access points 104. The graph may include nodes for each access point 104 and edges representing the distances 602 between the access points 104.

The controller 106 may determine the uncertainty range 208 in any suitable manner. For example, the controller 106 may determine the uncertainty range 208 as the maximum distance between an access point 104 in the group 204 and the centroid 206. As another example, the controller 106 may determine the uncertainty range 208 as the maximum graphical distance between an access point 104 and the graphical center.

In block 706, the controller 106 generates an AFC query 210 for the group 204. The AFC query 210 may include the determined centroid 206 and the uncertainty range 208. The controller 106 may then communicate the AFC query 210 to an AFC system to perform AFC for the group. The AFC system may return a response 212 indicating whether the group 204 should operate in the standard power mode or the low power mode. The response 212 may also indicate the allowed transmission power for the group 204.

Figure 8:
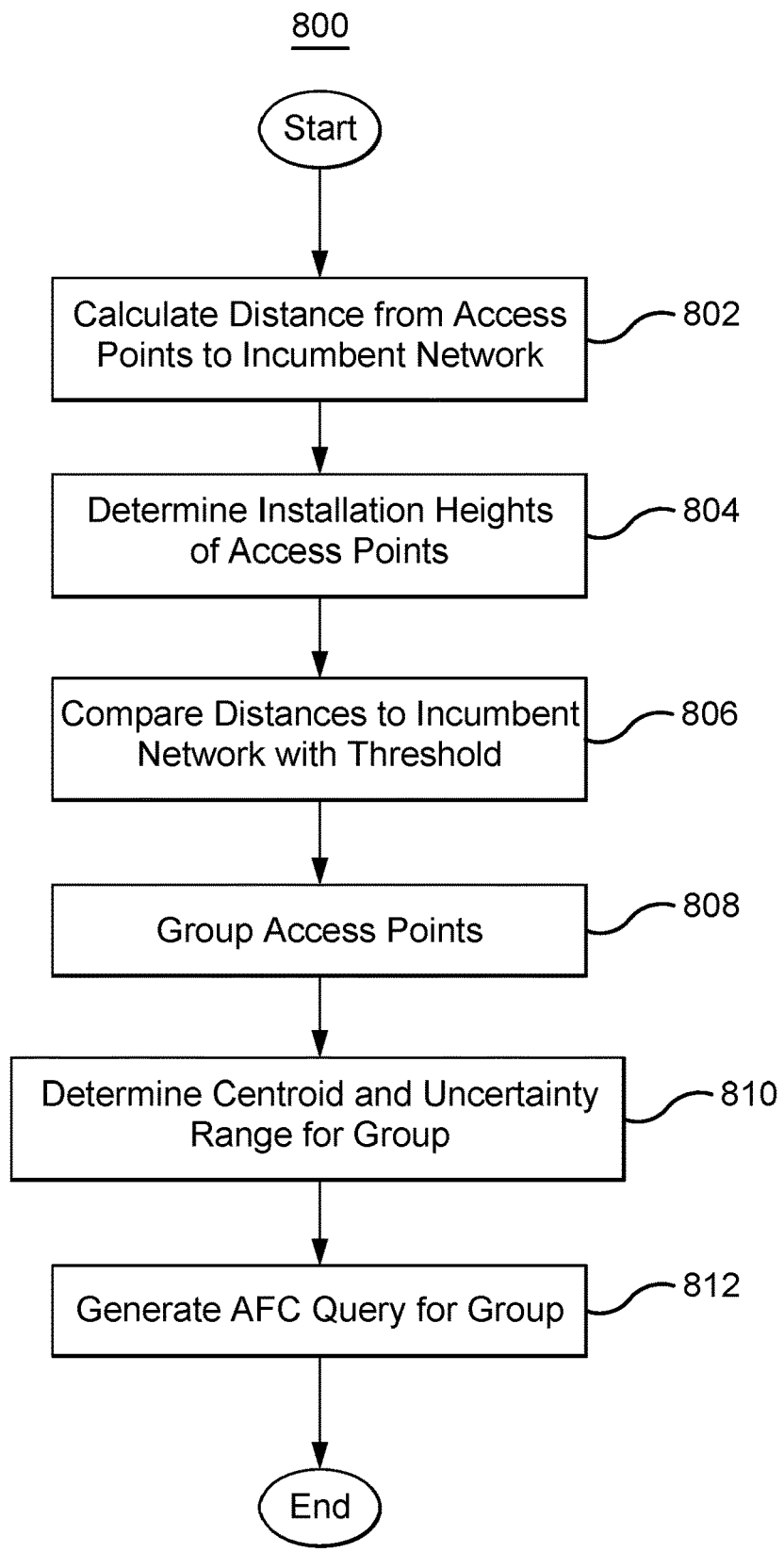
FIG. 8 is a flowchart of an example method performed in the system of FIG. 1.

FIG. 8 is a flowchart of an example method 800 performed in the system 100 of FIG. 1. In particular embodiments, the controller 106 performs the method 800. By performing the method 800, the controller 106 groups access points 104 and performs AFC for the groups 204.

In block 802, the controller 106 calculates distances 406 from the access points 104 to an incumbent network. The controller 106 may determine the radio frequency distance between the access points 104 and the incumbent network. In block 804, the controller 106 determines installation heights 410 of the access points 104.

The controller 106 then compares the distances 406 between the access points 104 and the incumbent network with a threshold 408 to determine the access points 104 that are within the threshold 408 distance and the access points 104 that are further than the threshold 408 distance from the incumbent network. In some embodiments, the controller 106 sets the threshold 408 using the determined installation heights 410 of the access points 104. The controller 106 may instruct the access points 104 that are further than the threshold 408 distance from the incumbent network to perform AFC individually. In block 808, the controller 106 groups the access points 104 that are within the threshold 408 distance of the incumbent network. In some embodiments, the controller 106 groups these access points 104 based on whether the access points 104 are within line-of-sight or not within line-of-sight of the incumbent network.

In block 810, the controller 106 determines a centroid 206 and an uncertainty range 208 for a group 204. The controller 106 may use any suitable technique for determining the centroid 206 and the uncertainty range 208. For example, the controller 106 may determine the centroid 206 as an average of the locations of the access points 104 in the group 204. As another example, the controller 106 may determine the centroid 206 as a graphical center of the access points 104. The graph may include nodes for each access point 104 and edges representing the distances 602 between the access points 104.

The controller 106 may determine the uncertainty range 208 in any suitable manner. For example, the controller 106 may determine the uncertainty range 208 as the maximum distance between an access point 104 in the group 204 and the centroid 206. As another example, the controller 106 may determine the uncertainty range 208 as the maximum graphical distance between an access point 104 and the graphical center.

In block 812, the controller 106 generates an AFC query 210 for the group 204. The AFC query 210 may include the centroid 206 and the uncertainty range 208 for the group 204. The controller 106 may then communicate the AFC query 210 to an AFC system to perform AFC for the group. The AFC system may return a response 212 indicating whether the group 204 should operate in the standard power mode or the low power mode. The response 212 may also indicate the allowed transmission power for the group 204.

In summary, a network deployment groups access points 104 for the purposes of AFC. For example, the network deployment may group access points 104 using information in previous AFC reports 202 generated for the access points 104. As another example, the network deployment may group access points 104 using distances between the access points 104 and an incumbent network. After grouping the access points 104, the network deployment may calculate a centroid 206 and an uncertainty range 208 for each group 204. The network deployment may then generate an AFC query 210 for each group 204 so that AFC is performed one time for the access points 104 in the group 204. In this manner, the network deployment reduces the amount of AFC queries generated, which may improve network performance.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
    assigning a plurality of access points to a plurality of groups based at least in part on stored automated frequency coordination (AFC) reports for the plurality of access points;
    determining, for each group of the plurality of groups, a centroid and an uncertainty range; and
    generating, for each group of the plurality of groups, an AFC query using the determined centroid and uncertainty range for the corresponding group.

2. The method of claim 1, wherein assigning the plurality of access points to the plurality of groups comprises generating, for each access point of the plurality of access points and based on the stored AFC report for each access point of the plurality of access points, a vector indicating (i) a geolocation of the corresponding access point and (ii) an allowed transmission power for the corresponding access point.

3. The method of claim 2, wherein the plurality of access points are assigned to the plurality of groups based at least in part on distances between the vectors for the plurality of access points.

4. The method of claim 1, wherein determining the centroid and uncertainty range for a group of the plurality of groups comprises:
    calculating an average of geolocations of access points assigned to the group, wherein the centroid for the group is based on the average of geolocations; and
    calculating, for each access point assigned to the group, a distance between the centroid for the group and the corresponding access point to produce a plurality of distances, wherein the uncertainty range for the group is based on a maximum of the plurality of distances.

5. The method of claim 1, wherein determining the centroid and uncertainty range for a group of the plurality of groups comprises calculating distances between the access points assigned to the group, wherein the centroid is based on the distances between the access points assigned to the group, and wherein the uncertainty range is based on a maximum of the distances between the access points assigned to the group.

6. The method of claim 5, wherein calculating the distances between the access points assigned to the group is performed using two-way ranging.

7. The method of claim 1, further comprising re-assigning an access point of the plurality of access points to a different group based at least in part on a response to the AFC query.

8. A method comprising:
    calculating a distance between a plurality of access points and an incumbent network;
    determining installation heights of the plurality of access points;
    for a first set of access points of the plurality of access points with distances to the incumbent network greater than a threshold, grouping the first set of access points based at least in part on the installation heights of the first set of access points to produce first groups of access points;
    determining, for each group of the first groups of access points, a centroid and an uncertainty range; and
    generating, for each group of the first groups of access points, an AFC query using the determined centroid and uncertainty range for the corresponding group.

9. The method of claim 8, further comprising, for a second set of access points of the plurality of access points with distances to the incumbent network lower than the threshold, grouping the second set of access points based at least in part on whether access points of the second set of access points are in line of sight of the incumbent network to produce second groups of access points.

10. The method of claim 8, wherein determining the centroid and uncertainty range for a group of the first groups of access points comprises:
    calculating an average of geolocations of access points assigned to the group, wherein the centroid for the group is based on the average of geolocations; and
    calculating, for each access point assigned to the group, a distance between the centroid for the group and the corresponding access point to produce a plurality of distances, wherein the uncertainty range for the group is based on a maximum of the plurality of distances.

11. The method of claim 8, wherein determining the centroid and uncertainty range for a group of the first groups of access points comprises calculating distances between the access points assigned to the group, wherein the centroid is based on the distances between the access points assigned to the group, and wherein the uncertainty range is based on a maximum of the distances between the access points assigned to the group.

12. The method of claim 11, wherein calculating the distances between the access points assigned to the group is performed using two-way ranging.

13. The method of claim 8, further comprising re-assigning an access point to a different group of the first groups of access points based at least in part on a response to an AFC query.

14. A network controller comprising:
    a memory; and
    a processor communicatively coupled to the memory, the processor configured to:
        assign a plurality of access points to a plurality of groups based at least in part on stored AFC reports for the plurality of access points;
        determine, for each group of the plurality of groups, a centroid and an uncertainty range; and
        generate, for each group of the plurality of groups, an AFC query using the determined centroid and uncertainty range for the corresponding group.

15. The network controller of claim 14, wherein assigning the plurality of access points to the plurality of groups comprises generating, for each access point of the plurality of access points and based on the stored AFC report for each access point of the plurality of access points, a vector indicating (i) a geolocation of the corresponding access point and (ii) an allowed transmission power for the corresponding access point.

16. The network controller of claim 15, wherein the plurality of access points are assigned to the plurality of groups based at least in part on distances between the vectors for the plurality of access points.

17. The network controller of claim 14, wherein determining the centroid and uncertainty range for a group of the plurality of groups comprises:
    calculating an average of geolocations of access points assigned to the group, wherein the centroid for the group is based on the average of geolocations; and
    calculating, for each access point assigned to the group, a distance between the centroid for the group and the corresponding access point to produce a plurality of distances, wherein the uncertainty range for the group is based on a maximum of the plurality of distances.

18. The network controller of claim 14, wherein determining the centroid and uncertainty range for a group of the plurality of groups comprises calculating distances between the access points assigned to the group, wherein the centroid is based on the distances between the access points assigned to the group, and wherein the uncertainty range is based on a maximum of the distances between the access points assigned to the group.

19. The network controller of claim 18, wherein calculating the distances between the access points assigned to the group is performed using two-way ranging.

20. The network controller of claim 14, wherein the processor is further configured to re-assign an access point of the plurality of access points to a different group based at least in part on a response to the AFC query.

* * * * *